US012164078B2

(12) United States Patent
Huo et al.

(10) Patent No.: US 12,164,078 B2
(45) Date of Patent: Dec. 10, 2024

(54) APPARATUS AND METHOD FOR REAL-TIME MONITORING OF GROUNDWATER LEVEL AND SOIL MOISTURE OF GULLY HEAD LANDFILL AREA

(71) Applicant: CHANG'AN UNIVERSITY, Xi'an (CN)

(72) Inventors: Aidi Huo, Xi'an (CN); Zhixin Zhao, Xi'an (CN); Luying Yang, Xi'an (CN); Xing Wang, Xi'an (CN); Fangqian Zhong, Xi'an (CN); Jian Chen, Xi'an (CN); Siming Chen, Xi'an (CN); Sibin Chen, Xi'an (CN); Lei Yang, Xi'an (CN)

(73) Assignee: CHANG'AN UNIVERSITY, Xi'an (CN)

( * ) Notice: Subject to any disclaimer, the term of this patent is extended or adjusted under 35 U.S.C. 154(b) by 500 days.

(21) Appl. No.: 17/527,199

(22) Filed: Nov. 16, 2021

(65) Prior Publication Data
US 2022/0075092 A1    Mar. 10, 2022

Related U.S. Application Data

(63) Continuation of application No. PCT/CN2020/096514, filed on Jun. 17, 2020.

(30) Foreign Application Priority Data

Jun. 27, 2019  (CN) .......................... 201910570237.6

(51) Int. Cl.
*G01V 9/02*    (2006.01)
*G01D 21/02*   (2006.01)
(Continued)

(52) U.S. Cl.
CPC ............... *G01V 9/02* (2013.01); *G01D 21/02* (2013.01); *G01F 23/0007* (2013.01); *G01F 23/80* (2022.01)

(58) Field of Classification Search
CPC ...... G01V 9/02; G01D 21/02; G01F 23/0007; G01F 23/00; G01F 23/80; A01G 25/00; Y02E 10/50; H02J 7/35; H02S 20/10
See application file for complete search history.

(56) References Cited

U.S. PATENT DOCUMENTS

| 6,491,828 | B1 | 12/2002 | Sivavec et al. |
| 10,208,585 | B2 | 2/2019 | Surowinski et al. |
| 11,150,166 | B2 | 10/2021 | Hou et al. |

FOREIGN PATENT DOCUMENTS

| CN | 201965128 U | 9/2011 |
| CN | 203893883 U | 10/2014 |

(Continued)

OTHER PUBLICATIONS

Internation Search Report of PCT/CN2020/096514, Mailed Sep. 10, 2020.

*Primary Examiner* — Tarun Sinha
(74) *Attorney, Agent, or Firm* — True Shepherd LLC; Andrew C. Cheng (57) ABSTRACT

An apparatus for real-time monitoring of groundwater level and soil moisture of a gully head landfill area includes: a groundwater observation well set up in a monitoring area; a drop-in liquid level transmitter placed in the groundwater observation well and configured to sense a change of groundwater level and transmit data to an environmental supervision cloud platform (ESCP) through a data collection module; a plurality of soil moisture transmitters arranged in layers on a wall of the groundwater observation well and configured to sense soil moisture; a data collection module configured to receive data from the drop-in liquid level (Continued)

transmitter and transmit the collected signal to an ESCP; and an environmental monitoring host configured to receive data from the soil moisture transmitters and transmit the data to an environmental monitoring cloud platform (EMCP). A user can view real-time data by remotely logging in to the ESCP and EMCP.

8 Claims, 6 Drawing Sheets

(51) Int. Cl.
    *G01F 23/00*     (2022.01)
    *G01F 23/80*     (2022.01)

(56) References Cited

FOREIGN PATENT DOCUMENTS

| | | | | |
|---|---|---|---|---|
| CN | 106679735 | A | | 5/2017 |
| CN | 107192427 | A | | 9/2017 |
| CN | 107242107 | A | * | 10/2017 |
| CN | 106679735 | B | * | 6/2018 |
| CN | 109489769 | A | * | 3/2019 ............. G01F 23/00 |
| CN | 208621098 | U | | 3/2019 |
| CN | 209889600 | A | | 6/2019 |
| CN | 110207758 | A | | 9/2019 |
| CN | 210268717 | U | | 4/2020 |
| JP | 2011047676 | A | * | 3/2011 |

* cited by examiner

APPARATUS AND METHOD FOR REAL-TIME MONITORING OF GROUNDWATER LEVEL AND SOIL MOISTURE OF GULLY HEAD LANDFILL AREA

CROSS-REFERENCE TO RELATED APPLICATIONS

This application is a continuation of International Patent Application No. PCT/CN2020/096514 with a filing date of Jun. 17, 2020, designating the United States, and further claims priority to Chinese Patent Application No. 201910570237.6 with a filing date of Jun. 27, 2019. The content of the aforementioned applications, including any intervening amendments thereto, are incorporated herein by reference.

TECHNICAL FIELD

The present disclosure relates to the field of environmental monitoring and protection, and specifically, to an apparatus and method for real-time monitoring of groundwater level and soil moisture of a gully head landfill area, to provide a data basis for exploring the causes of damage to the engineering measures in a gully head landfill area for gully consolidation and highland protection (GCHP) on the Loess Plateau.

BACKGROUND

The Loess Plateau, one of the birthplaces of ancient Chinese civilization, has fine grains, soft soil, and rich mineral nutrients, and is good for farming and has nurtured generations of residents in the loess area. However, due to its special geomorphic features, climate types and soil characteristics, the Loess Plateau has also become one of the world's most soil-eroded and ecologically vulnerable areas. In recent years, many ground subsidences and ground fissures have emerged during the process of GCHP and ecological environment management, making it indispensable to carry out real-time monitoring of the groundwater level and soil moisture in gully head landfill areas. Monitoring apparatuses and technologies are important means of scientific research.

Currently, four soil erosion prevention and control measures are used in the research process: tillage measures, forest-grass measures, ecological restoration, and engineering measures. Due to the special geologic structure and soil characteristics of the Loess Plateau, many engineering measures for GCHP are damaged by the rise and fall of groundwater level and changes in soil water content, which are likely to cause a large number of geological disasters. For example, the gully head has been hardened after the landfill, but the uneven settlement of the foundation causes concrete breaks and cracks.

Therefore, it is necessary to monitor in real time the groundwater level and soil moisture of the gully head landfill area for GCHP, and explore a relationship between soil moisture thresholds, groundwater level thresholds and uneven soil settlement by developing monitoring apparatuses and methods.

SUMMARY

In view of the foregoing prior-art problems, the present disclosure is intended to provide an apparatus and a method for real-time monitoring of groundwater level and soil moisture of a gully head landfill area, to simultaneously monitor the groundwater level and soil moisture with stable operation and high reliability.

In order to achieve the above objective, the technical solution adopted by the present disclosure is as follows: A groundwater observation well is set up in a monitoring area; a drop-in liquid level transmitter is placed in the groundwater observation well and the drop-in liquid level transmitter senses a change of groundwater level and transmits data to an environmental supervision cloud platform through a data collection module; a plurality of soil moisture transmitters are arranged in layers on a wall of the groundwater observation well, each soil moisture transmitter transmits a collected signal to a signal bus, the signal bus is connected to an environmental monitoring host, the environmental monitoring host is wirelessly connected to an environmental monitoring cloud platform, and a user can view real-time data by remotely logging in to the environmental supervision cloud platform and the environmental monitoring cloud platform; and the data collection module and the environmental monitoring host are connected to a power supply module.

The power supply module includes a battery and two power supply branches that are connected to the battery at the same time, where one branch is a civil power grid that charges the battery through a smart charger, and the other branch is a solar panel that charges the battery through a solar panel controller; and the smart charger and the solar panel controller implement short— and open-circuit protection, and overcharge and over-discharge protection.

The drop-in liquid level transmitter and the data collection module are connected by using a coaxial cable, and the solar panel, the solar panel controller, the battery, and the data collection module are all connected by using a wire.

The solar panel is installed on a solar panel bracket. A stainless steel storage box is attached to the middle of the solar panel bracket. The stainless steel storage box is used to accommodate the solar panel controller, the smart charger, the battery, the data collection module, and the environmental monitoring host.

The solar panel bracket is made of stainless steel square tubes.

The wall of the groundwater observation well is made of PVC tubes, the bottom of the groundwater observation well is sleeved with an outer tube, a bottom end of the groundwater observation well is closed, a screw cover is provided in an upper part of the outer tube, a hole for inserting the groundwater observation well is reserved in the center of the cover, water inlet holes are evenly provided in the entire wall of the outer tube, and outside the wall is provided with a fine sand layer, a medium sand layer, and a coarse sand layer from the inside out; the groundwater observation well extends to the ground, water inlet holes are provided in a portion of the groundwater observation well wrapped by the outer tube, and the water inlet holes and a portion below the water inlet holes are wrapped with a layer of geotextile.

The water inlet hole in the groundwater observation well is smaller than that in the outer tube, and is provided on the upper part, and the groundwater filtered by the outer tube is preliminarily precipitated through a space between the groundwater observation well and the outer tube. The soil moisture transmitter is fastened to the wall of the groundwater observation well by using a buckle. The buckle includes two semicircular position fixing structures. The position fixing structure is provided with a bolt hole on the top, and is fastened to a fixed position of the groundwater observation well by using a bolt. One of the semicircular position fixing structures is provided with a cylindrical protrusion in the middle of the outer side, and three strapping grooves are reserved on the cylindrical protrusion. A probe of the soil moisture transmitter is tied to the cylindrical protrusion by using a strap. A combing hole is provided next to the cylindrical protrusion, and configured to fasten and comb wires of the soil moisture transmitter.

The environmental monitoring host is wirelessly connected to the environmental monitoring cloud platform over General Packet Radio Service (GPRS).

The monitoring method for real-time monitoring of groundwater level and soil moisture of a gully head landfill area according to the present disclosure includes the following steps.

Step 1: A drop-in liquid level transmitter placed in a groundwater observation well and soil moisture transmitters fastened on an outer wall of the groundwater observation well in layers generate monitoring signals in real time.

Step 2: A groundwater level signal generated by the drop-in liquid level transmitter is transmitted to a data collection module; and soil moisture signals generated by the soil moisture transmitters are transmitted to a signal bus, and then transmitted to an environmental monitoring host by using the signal bus.

Step 3: The data collection module transmits water level data to an environmental supervision cloud platform through a built-in wireless transmission module; and the environmental monitoring host transmits the soil moisture signals to an environmental monitoring cloud platform through the built-in wireless transmission module.

Step 4. A user logs in to the environmental supervision cloud platform and the environmental monitoring cloud platform to view real-time data.

The wireless transmission module is equipped with a mobile internet traffic card, data is transmitted to the environmental supervision cloud platform and the environmental monitoring cloud platform, monitoring data and analysis results can be sent to a terminal with a pre-designated mobile number, and the terminal with the pre-designated mobile number can also send a text message to the mobile internet traffic card, to remotely set monitoring ranges of water level data and soil moisture data.

Compared with the prior art, the apparatus for real-time monitoring of groundwater level and soil moisture of a gully head landfill area according to the present disclosure can simultaneously monitor real-time data of the groundwater level and soil moisture. A groundwater observation well is set up in a monitoring area, a drop-in liquid level transmitter is placed in the groundwater observation well, and a plurality of soil moisture transmitters are arranged in layers on a wall of the groundwater observation well, implementing stable operation and high reliability. A user can conveniently view real-time data by remotely logging in to an environmental supervision cloud platform and an environmental monitoring cloud platform. In this way, the two monitoring functions are implemented at the same time for gully head landfill areas on the Loess Plateau, to explore a relationship between the causes of damage to engineering measures in the gully head landfill area on the Loess Plateau and the groundwater level and soil moisture, laying a theoretical foundation for formulating scientific measures for GCHP.

Further, a power supply module of the present disclosure includes a battery and two power supply branches that supply power to the battery simultaneously. With a single power supply system, the system is likely to suffer power outage in the case of damage, such as a power outage of a rural power grid and no power supply during circuit maintenance at slack time. Alternatively, a solar power supply system cannot guarantee 100% uninterrupted power supply in severe weather conditions such as cloudy and rain, or under low conversion efficiency due to long-term snow or dust accumulation on a solar panel. The power supply module of the present disclosure is powered by dual power supply branches: one branch is a rural power grid, and the other branch is a solar panel, both of which charge the battery; a solar panel controller and a smart charger provides overcharging protection for the battery; and the battery supplies power to the apparatus, meeting the requirements of long-term stable power supply.

Further, a solar panel bracket of the present disclosure is made of stainless steel square tubes connected by using bolts, can be installed conveniently and provides a good fastening effect. A stainless steel storage box protects the apparatuses placed therein against damages from wind, rain, and sun.

Further, the underground water observation well of the present disclosure is made of PVC tubes that are corrosion-resistant and anti-oxidant, eliminating the need for the complicated solidification of the well wall; a structure for blocking silt is provided at the bottom of the groundwater observation well, two layers of inner and outer tubes together prevent silt, and both layers of tubes are provided with water inlet holes to ensure that the groundwater level is consistent with the water level in the well. The incoming groundwater is pre-treated in the outer layer, and then preliminarily precipitated in the reserved space between the two layers, and the sediment is blocked again by the geotextile wrapped in the inner layer to ensure that the groundwater entering the groundwater observation well carries less sediment, solving the problem of sediment clogging at the bottom, and effectively preventing the drop-in liquid level transmitter from clogging.

Compared with the prior art, the method for real-time monitoring of groundwater level and soil moisture in a gully head landfill area according to the present disclosure simultaneously monitors real-time data of the groundwater level and soil moisture, saving the trouble of separate installation; collects data on the spot, ensuring data accuracy; and remotely transmits data wirelessly, saving the need of manual data collection, reducing the workload, and improving the data accuracy.

In the figures, 1. civil power grid; 2. solar panel; 3. battery; 4. drop-in liquid level transmitter; 5. data collection module; 6. groundwater observation well; 6-1. outer tube;

6-2. water inlet hole; 6-3. geotextile; 6-4. fine sand layer; 6-5. medium sand layer; 6-6. coarse sand layer; 7. soil moisture transmitter; 7-1. probe; 7-2. wire; 8. buckle; 8-1. first semicircular position fixing structure; 8-2. second semicircular position fixing structure; 9. environmental monitoring host; 10. solar panel bracket; 10-1. hook; 10-2. bolt; 10-3. bolt hole; 10-4. fastening screw; 11. concrete; 12. stainless steel storage box; 12-1. box buckle; 12-2. cable and antenna outlet; 12-3. coded lock; 13. solar panel controller; 14. smart charger; 15. signal bus; 16. coaxial cable; 17. bolt; 18. strapping slot; 19. combing hole; and 20. cylindrical protrusion.

DETAILED DESCRIPTION OF THE EMBODIMENTS

The present disclosure is described in detail below with reference to the accompanying drawings.

Figure 1:
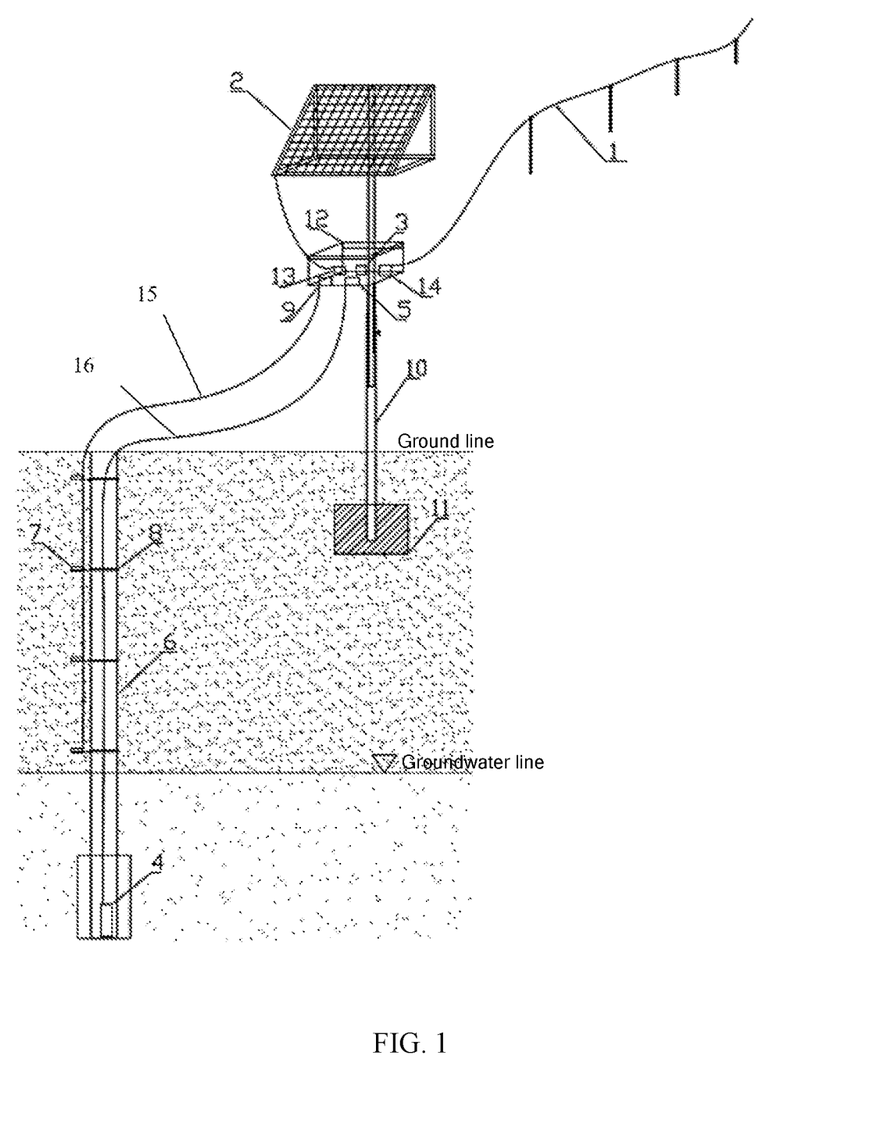
FIG. 1 is a schematic structural diagram of a real-time monitoring apparatus according to the present disclosure.

Referring to FIG. 1, an apparatus for real-time monitoring of groundwater level and soil moisture of a gully head landfill area of the Loess Plateau according to the present disclosure mainly includes two parts: a groundwater level monitoring apparatus and a soil moisture monitoring apparatus. The groundwater level monitoring apparatus mainly includes a power supply module and a data collection and transmission module. The power supply module adopts dual power supplies, where one is connected to a civil power grid 1 and the other is powered by a solar panel 2, the civil power grid 1 is connected to a smart charger 14 that is connected to a battery 3, the solar panel 2 is connected to a solar panel controller 13 that is also connected to the battery 3, and then the battery 3 supplies power to the soil and groundwater monitoring apparatuses. A data collection module 5 and a drop-in liquid level transmitter 4 form a data collection and transmission module, where the drop-in liquid level transmitter 4 is placed in a groundwater observation well 6 to sense changes of the groundwater level, and the data collection module 5 collects data and transmits the obtained data to an environmental supervision cloud platform.

The soil moisture monitoring apparatus and the groundwater level monitoring apparatus are powered by the same power supply. A plurality of soil moisture transmitters 7 are fastened on buckles 8, and then installed on a wall of the groundwater observation well 6 layer by layer to monitor the soil moisture layer by layer. Each soil moisture transmitter 7 transmits a collected signal to a signal bus 15. The signal bus 15 is connected to an environmental monitoring host 9. The environmental monitoring host 9 wirelessly transmits the signal to an environmental monitoring cloud platform over GPRS. A user can view real-time data through remote login.

The solar panel 2 is installed on a solar panel bracket 10. The bottom of the bracket is fastened by using concrete 11. A stainless steel storage box 12 is attached to the middle of the solar panel bracket, to accommodate the solar panel controller 13, the smart charger 14, the battery 3, the data collection module 5, and the environmental monitoring host 6, so as to protect the devices against severe environments.

Figure 3:
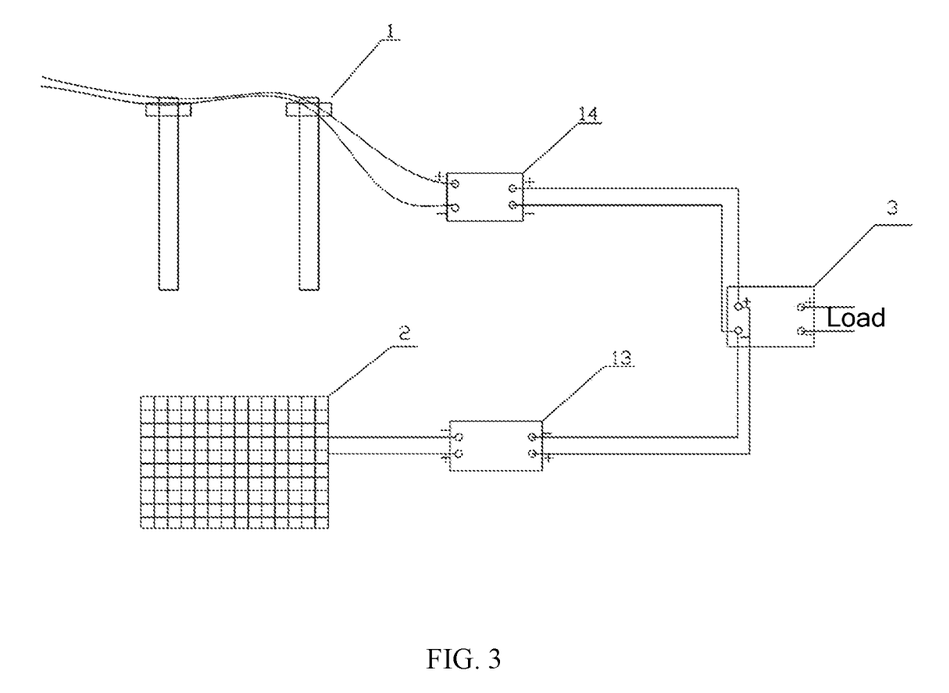
FIG. 3 is a schematic connection diagram of a dual-powered power supply module according to the present disclosure.

Referring to FIG. 3, the power supply module of the apparatus for real-time monitoring of groundwater level and soil moisture according to the present disclosure includes two parts: one is the civil power grid 1 that is connected to the smart charger 14 to charge the battery 3; and the other is the solar panel 2 that is used with the battery 3 for power supply, where the solar panel 2 is connected to the solar panel controller 13 and then the battery 3 to store converted electric energy in the battery 3. The solar panel controller 13 and the smart charger 14 mainly implement short- and open-circuit protection, and overcharge and over-discharge protection.

The power supply module supplies power to the groundwater level monitoring apparatus and the soil moisture monitoring apparatus. The apparatuses require that an output voltage should be 12 V.

The drop-in liquid level transmitter 4 and the data collection module 5 of the present disclosure are connected by using a coaxial cable 16, and the solar panel 2, the solar panel controller 13, the battery 3, and the data collection module 5 are all connected by using a wire. The drop-in liquid level transmitter 4 completes signal generation, the data collection module 5 completes data conversion and signal transmission, the soil moisture transmitter 7 senses signal changes, a signal is transmitted to the bus and then to the environmental monitoring host 9, and the environmental monitoring host 9 completes signal transmission.

Figure 5:
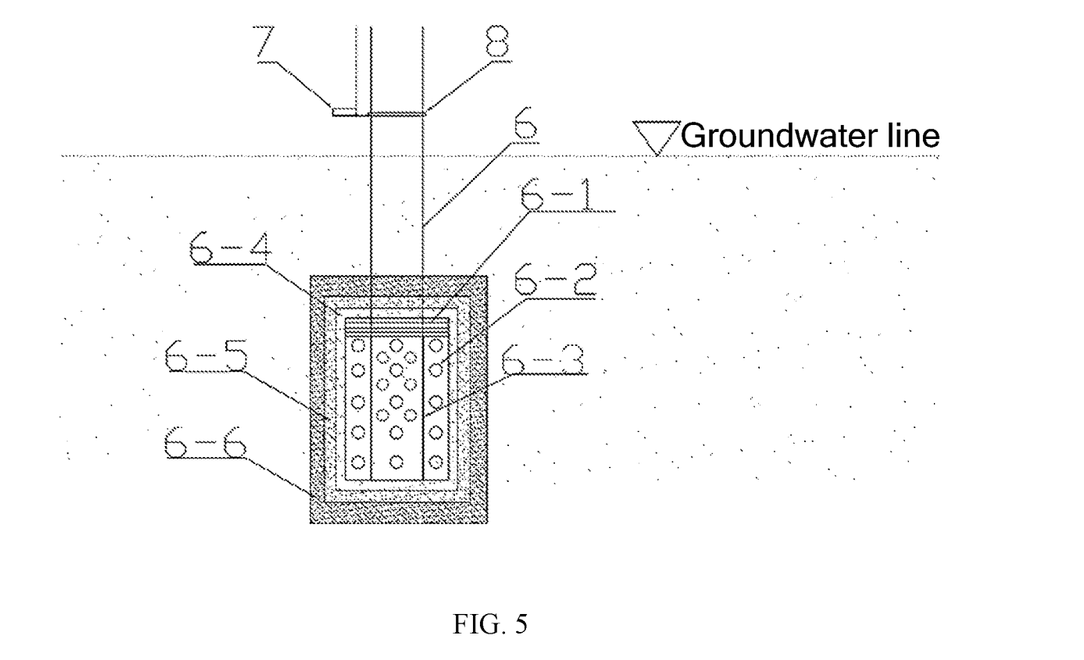
FIG. 5 is a schematic diagram of an anti-clogging structure at the bottom of a groundwater observation well according to the present disclosure.

Referring to FIG. 5, the wall of the groundwater observation well 6 is made of PVC tubes, and an anti-sand structure at the bottom includes an groundwater observation well and an outer tube 6-1. The outer tube 6-1 sleeves the bottom of the groundwater observation well, with a height of 50 cm and a diameter twice that of the groundwater observation well. The bottom of the groundwater observation well is closed, a screw cover is provided in an upper part of the outer tube 6-1, a hole for inserting an groundwater observation well is reserved in the center of the cover, water inlet holes 6-2 are evenly provided in the entire wall, and outside the wall is provided with a fine sand layer 6-4, a medium sand layer 6-5, and a coarse sand layer 6-6 in sequence from the inside out; the groundwater observation well extends to the ground, water inlet holes 6-2 are evenly provided in an upper portion of the groundwater observation well wrapped by the outer tube, and the water inlet holes and portions below the water inlet holes are wrapped with a layer of geotextile 6-3, to solve the problem of sediment clogging at the bottom.

The space between the groundwater observation well and the outer tube 6-1 can preliminarily precipitate the groundwater filtered by the outer tube 6-1. The water inlet hole of the groundwater observation well is smaller than that of the outer tube 6-1, and is provided at the upper part, to prevent sediment from entering the groundwater observation well. The soil moisture transmitter 7 includes a probe, a power cord, and a transmission wire, and collects a signal and transmits the signal to the environmental monitoring host 9.

Figure 6:
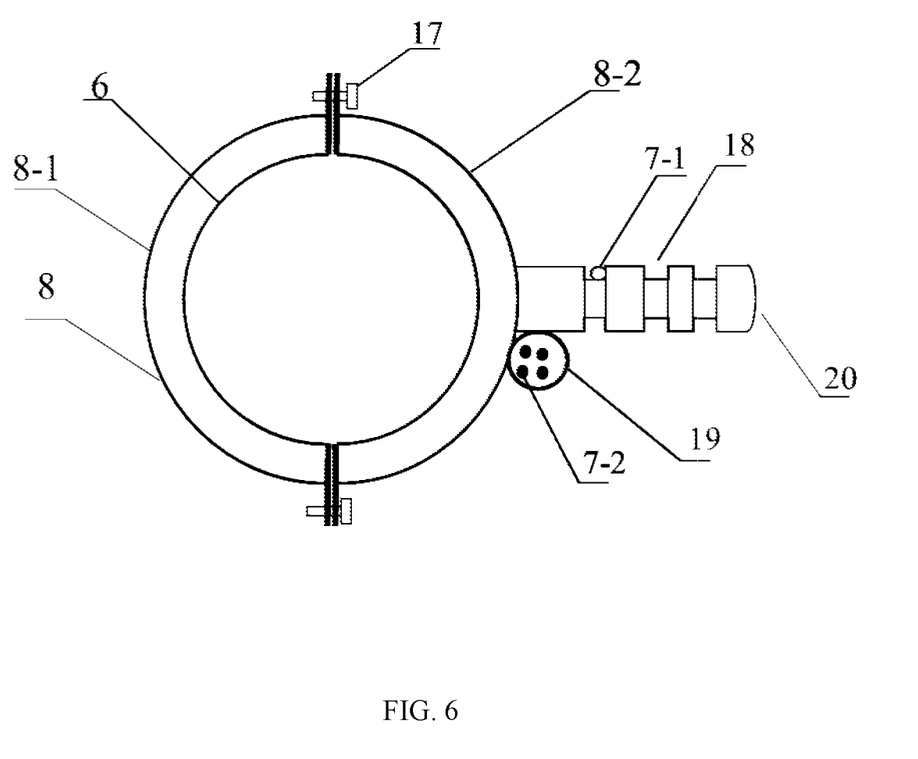
FIG. 6 is a schematic diagram of a buckle structure according to the present disclosure.

The buckle 8 is made of PVC, and is configured to fix a monitoring position and fasten the probe 7-1 of the soil moisture transmitter 7. The buckle 8 includes two semicircular position fixing structures 8-1 and 8-2 that have a height of 4 cm, are provided with a bolt hole on the top, and are fastened to the groundwater observation well 6 at a fixed position by using a bolt 17. One of the semicircular position fixing structures 8-2 is provided with a cylindrical protrusion 20 in the middle of the outer side. Three strapping grooves 18 are reserved in the cylindrical protrusion 20, and the probe 7-1 of the soil moisture transmitter 7 is tied to the strapping groove 18 with a strap, so as to fasten the soil moisture transmitter 7. In addition, a combing hole 19 is provided next to the cylindrical protrusion 20, and is configured to fasten and comb wires 7-2 of the soil moisture transmitter 7. The environmental monitoring host 9 includes a power hole, a traffic card slot, a signal interface, and an antenna base; and transmits the signal of the soil moisture transmitter to the environmental monitoring cloud platform.

Figure 4:
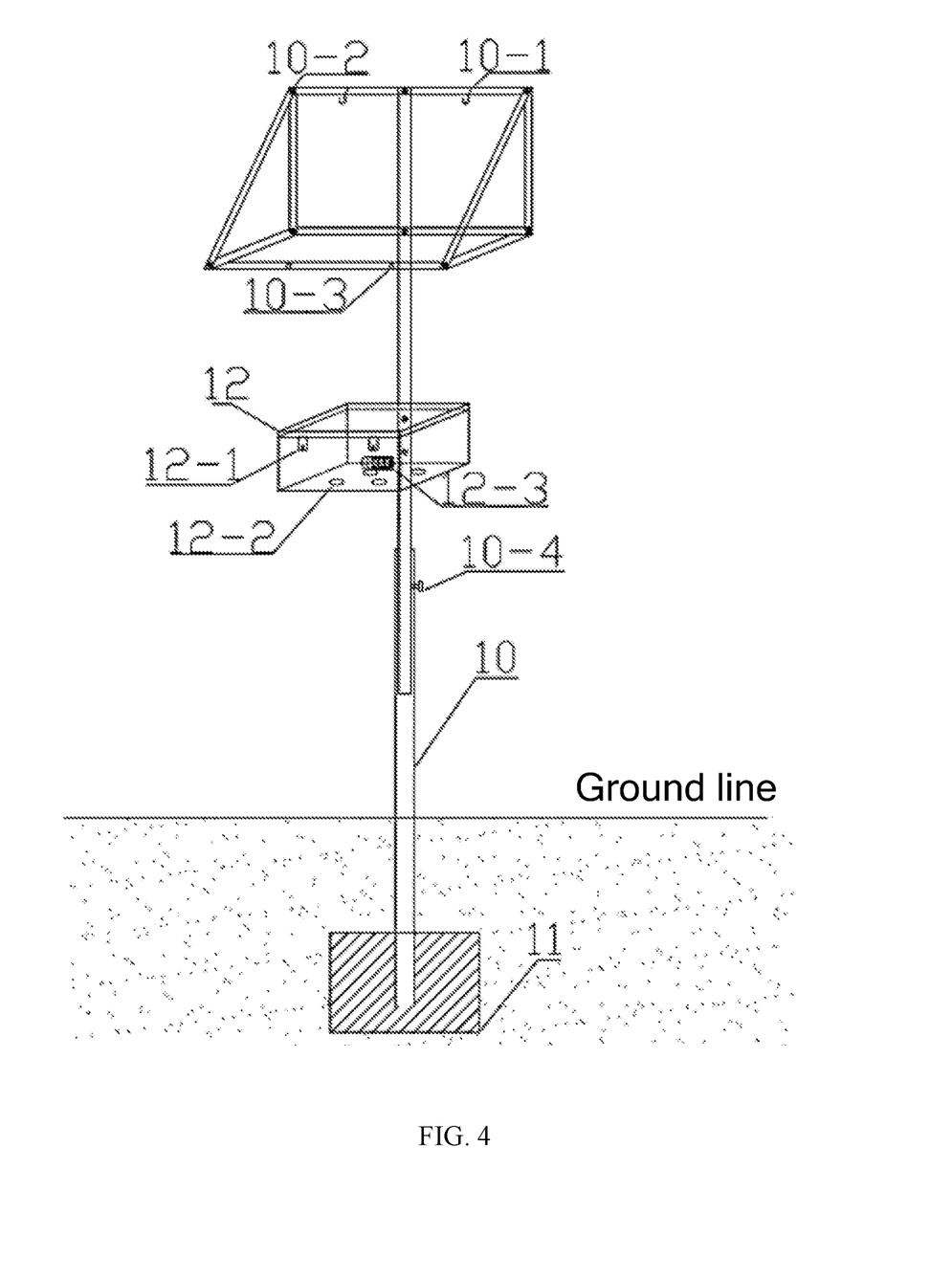
FIG. 4 is a schematic structural diagram of a solar panel bracket according to the present disclosure.

Referring to FIG. 4, the solar panel bracket 10 of the real-time monitoring apparatus of the present disclosure is made of stainless steel square tubes, and is configured to fasten the solar panel 2. The stainless steel storage box 12 is installed in the middle of the bracket, to accommodate devices. Cable and antenna outlets 12-2 are provided at the bottom, and a coded lock 12-3 is used to protect the devices in the box. The solar panel bracket 10 is composed of 12 stainless steel square tubes and a stainless steel storage box 12. The bottom of the solar panel bracket 10 is fastened in the concrete 11.

Figure 2:
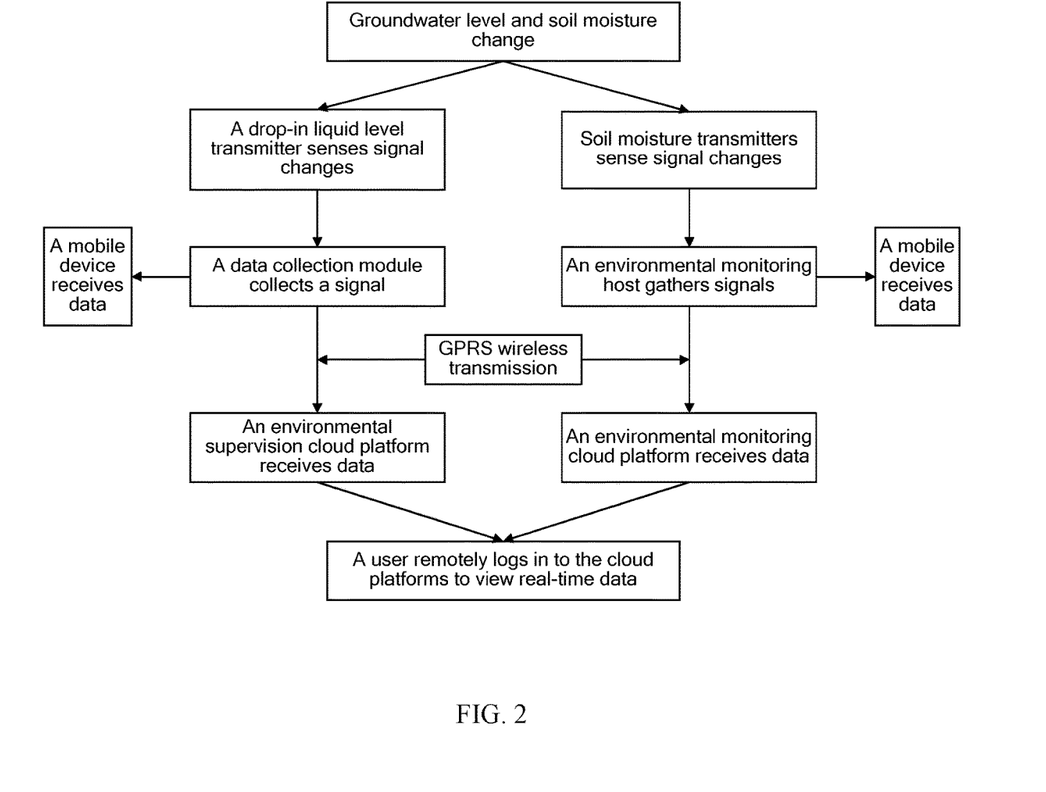
FIG. 2 is a flowchart of a monitoring method according to the present disclosure.

A method for real-time monitoring of groundwater level and soil moisture of a gully head landfill area on the Loess Plateau according to the present disclosure includes the following steps.

Step 1: A drop-in liquid level transmitter 4 placed in a groundwater observation well 6 and soil moisture transmitters 7 fastened on an outer wall of the groundwater observation well 6 in layers generate signals in real time.

Step 2: A groundwater level signal generated by the drop-in liquid level transmitter 4 is transmitted to a data collection module 5; and soil moisture signals generated by the soil moisture transmitters 7 are transmitted to a bus, and then transmitted to an environmental monitoring host 9 by using the bus.

Step 3: The data collection module 5 transmits water level data to an environmental supervision cloud platform through a built-in GPRS wireless transmission module; and the environmental monitoring host 9 transmits the soil moisture signals to an environmental monitoring cloud platform through the built-in GPRS wireless transmission module.

Step 4. A user logs in to the environmental supervision cloud platform and the environmental monitoring cloud platform to view real-time data, or view the data on a mobile device.

In step 1, the drop-in liquid level transmitter 4 is placed at the bottom of the groundwater observation well 6; and a plurality of soil moisture transmitters 7 are installed on the outer wall of the groundwater observation well 6 from the bottom up at an interval of 1 m.

In step 3, the GPRS wireless transmission module is equipped with a mobile internet traffic card to transmit data to the environmental platform, and send monitoring data and analysis results to a mobile number pre-designated in the environmental platform. A mobile device with the mobile number pre-designated in the environmental platform can send a text message to the mobile internet traffic card in the GPRS wireless transmission module to set monitoring ranges of water level data and soil moisture data.

The foregoing embodiments are only the preferred embodiments of the present disclosure, and are not intended to impose any limitation on the embodiments of the present disclosure. Those of ordinary skill in the art should understand that simple modifications and replacements can be made to the technical solutions without departing from the spirit and principle of the present disclosure. There modifications and replacements shall also fall within the protection scope of the claims of the present disclosure.

What is claimed is:

1. An apparatus for real-time monitoring of groundwater level and soil moisture of a gully head landfill area for Gully Consolidation and Highland Protection (GCHP), comprising:

a groundwater observation well, set up in a monitoring area in a middle of the gully head landfill area for GCHP;

a drop-in liquid level transmitter, placed in the groundwater observation well and configured to sense a water level change of groundwater;

a plurality of soil moisture transmitters, arranged on a wall of the underground water observation well in layers and configured to sense soil moisture;

a data collection module, configured to receive data from the drop-in liquid level transmitter and transmit the data to an environmental supervision cloud platform; and an environmental monitoring host, configured to receive data from the soil moisture transmitters and transmit the data to an environmental monitoring cloud platform; wherein a bottom of the groundwater observation well is sleeved with an outer tube, bottom end of the groundwater observation well is closed, a screw cover is provided in an upper part of the outer tube, a hole for inserting the groundwater observation well is reserved in a center of the cover, water inlet holes are evenly provided in entire wall of the outer tube, and outside the wall is provided with a fine sand layer, a medium sand layer, and a coarse sand layer from inside out; the groundwater observation well extends to the ground, water inlet holes are provided in a portion of the groundwater observation well wrapped by the outer tube, and the water inlet holes and a portion below the water inlet holes are wrapped with a layer of geotextile;

wherein the soil moisture transmitter is fastened on the wall of the groundwater observation well through a buckle, the buckle comprises a first semicircular position fixing structure and a second semicircular position fixing structure, the first and second position fixing structures each are provided with a bolt hole on the top, and are fastened to the groundwater observation well by using a bolt, a cylindrical protrusion is provided in the middle of an outer side of the second semicircular position fixing structure, three strapping grooves are reserved on the cylindrical protrusion, a probe of the soil moisture transmitter is tied to the strapping groove, and a combing hole is provided next to the cylindrical protrusion and configured to fasten and comb wires of the soil moisture transmitter.

2. The apparatus according to claim 1, wherein each soil moisture transmitter transmits a collected signal to a signal bus, the signal bus is connected to the environmental monitoring host, and the environmental monitoring host is wirelessly connected to the environmental monitoring cloud platform; a user remotely logs in to the environmental supervision cloud platform and the environmental monitoring cloud platform to view real-time data; and the data collection module and the environmental monitoring host are connected to a power supply module.

3. The apparatus according to claim 2, wherein the power supply module comprises a battery and two power supply branches that are connected to the battery at the same time, wherein one branch is a civil power grid that charges the battery through a smart charger, and the other branch is a solar panel that charges the battery through a solar panel controller; and the smart charger (14) and the solar panel controller implement short- and open-circuit protection, and overcharge and over-discharge protection.

4. The apparatus according to claim 3, wherein the drop-in liquid level transmitter and the data collection module (5)

are connected by using a coaxial cable, and the solar panel, the solar panel controller, the battery, and the data collection module are connected by using a wire.

5. The apparatus according to claim 3, wherein the solar panel is installed on a solar panel bracket, a stainless steel storage box is attached to the middle of the solar panel bracket, and the stainless steel storage box is configured to accommodate the solar panel controller, the smart charger, the battery, the data collection module, and the environmental monitoring host; and the solar panel bracket is made of stainless steel square tubes.

6. The apparatus according to claim 1, wherein the wall of the groundwater observation well is made of PVC tubes.

7. The apparatus according to claim 1, wherein the water inlet hole on the groundwater observation well is smaller than that on the outer tube, and is provided in the upper part, and the groundwater filtered by the outer tube is preliminarily precipitated through a space between the groundwater observation well and the outer tube.

8. The apparatus according to claim 1, wherein the environmental monitoring host is wirelessly connected to the environmental monitoring cloud platform over General Packet Radio Service (GPRS).

* * * * *